United States Patent [19]

Oliver et al.

[11] Patent Number: 4,928,480
[45] Date of Patent: May 29, 1990

[54] SEPARATOR HAVING MULTIPLE PARTICLE EXTRACTION PASSAGEWAYS

[75] Inventors: Wayne R. Oliver, Peabody, Mass.; Roy E. Moyer, Cincinnati, Ohio; Dennis R. Girardin, Peabody, Mass.

[73] Assignee: General Electric Company, Lynn, Mass.

[21] Appl. No.: 164,371

[22] Filed: Mar. 4, 1988

[51] Int. Cl.⁵ .............................................. F07C 7/052
[52] U.S. Cl. ............................... 60/39.092; 55/306
[58] Field of Search ........................ 60/39.092, 39.093; 55/306; 137/15.1; 244/53 B; 415/121 G

[56] References Cited

U.S. PATENT DOCUMENTS

| | | |
|---|---|---|
| 2,721,715 | 10/1955 | Hoadley . |
| 3,148,043 | 9/1964 | Richardson et al. ................ 55/306 |
| 3,309,867 | 3/1967 | Ehrich . |
| 3,338,049 | 8/1967 | Fernberger . |
| 3,362,155 | 1/1968 | Driscoll . |
| 3,436,910 | 4/1969 | Haworth ......................... 60/39.092 |
| 3,513,641 | 5/1970 | Hooper et al. ................... 60/39.092 |
| 3,521,431 | 7/1970 | Connors et al. . |
| 3,534,548 | 10/1970 | Connors . |
| 3,616,616 | 11/1971 | Flatt ................................ 55/306 |
| 3,766,719 | 10/1973 | McAnally, III ................... 55/306 |
| 3,778,983 | 12/1973 | Rygg ................................ 55/306 |
| 3,832,086 | 8/1974 | Hull, Jr. et al. ................ 415/121 G |
| 3,970,439 | 7/1976 | Murphy ............................ 60/39.092 |
| 3,977,811 | 8/1976 | Kuintzle, Jr. ................. 415/121 G |
| 3,978,656 | 9/1976 | Murphy ............................ 60/39.092 |
| 3,979,903 | 9/1976 | Hull, Jr., et al. .............. 60/39.092 |
| 4,265,465 | 5/1981 | Weinstein et al. ................ 55/306 |
| 4,268,284 | 5/1981 | Kent et al. ...................... 60/39.092 |
| 4,509,962 | 4/1985 | Breitman et al. . |
| 4,527,387 | 7/1985 | Lastrina et al. ................. 60/39.092 |
| 4,592,765 | 6/1986 | Breitman et al. ................. 55/306 |
| 4,702,071 | 10/1987 | Jenkins et al. .................. 60/39.092 |
| 4,704,145 | 11/1987 | Norris et al. ................... 60/39.092 |

FOREIGN PATENT DOCUMENTS

| | | |
|---|---|---|
| 663194 | 12/1951 | United Kingdom . |
| 1417154 | 12/1975 | United Kingdom ............. 60/39.092 |
| 2069053 | 8/1981 | United Kingdom . |

Primary Examiner—Donald E. Stout
Attorney, Agent, or Firm—Francis L. Conte; Jerome C. Squillaro

[57] ABSTRACT

A gas turbine engine utilizes a main and at least one auxiliary particle separator for enhancing the separation of foreign particles from a stream of air entering the engine. The engine includes interior walls which collectively define an engine intake passageway and a compressor inlet passageway in flow communication with the intake passageway so as to provide a primary flowpath for air traveling through the engine to the engine compressor. The main and auxiliary particle separators each include a passageway associated with a corresponding interior wall of the engine. Each separator passageway has an inlet opening to one side of the main flowpath and directed generally upstream of the primary flowpath so as not to appreciably effect the pressure loss through the engine. Furthermore, each separator passageway includes a section adjacent its inlet which is arranged relative to the primary flow path extending thereacross so as to facilitate the acceptance of an amount of air flowing along and adjacent the corresponding wall by the separators and thereby facilitate the acceptance of foreign particles entrained within the amount of air.

33 Claims, 3 Drawing Sheets

SEPARATOR HAVING MULTIPLE PARTICLE EXTRACTION PASSAGEWAYS

The Government has rights in this invention pursuant to Contract No. DAAK51-83-C-0014 awarded by the Department of the Army.

BACKGROUND OF THE INVENTION

This invention relates generally to a gas turbine engine and, more specifically, to a system employed within such an engine for separating foreign particles from a stream of air entering the engine.

A gas turbine engine commonly includes an intake for receiving all of the air entering the engine and a compressor inlet for receiving air entering the engine compressor. Each engine further includes interior walls defining a primary flowpath for air traveling from the intake to the compressor inlet. In order to reduce the likelihood of ingestion of foreign particles, such as sand or dust, by the engine, it is known that a particle separator system can be employed at the compressor inlet for scavenging foreign particles from the engine intake air. Commonly, such a separator system includes an annular partition, or splitter lip, appropriately positioned in relationship to the primary flowpath so that when the gas turbine is in operation, air intended for use by the compressor is directed along one side of the splitter lip, and foreign particles carried by the air entering the intake are directed along the other side of the splitter lip for collection and subsequent removal. Examples of such separator systems are shown and described in U.S. Pat. Nos. 3,832,086, 4,265,646 and 4,527,387, each having the same assignee as the present invention.

Conventional particle separator systems, such as those described in the referenced patents, possess only a single annular inlet for receiving foreign particles carried by the air enterng the engine intake. While conventional separator systems possessing a single inlet are known to separate a substantial portion of such foreign particles from the intake air, some foreign particles, including many of the finer particles, will likely bypass the separator inlet or accumulate in the engine air passageways and thereby not be collected by the separator system. Such a bypassing or accumulation of particles may promote deterioration, and thereby shorten the useful life, of internal engine components and reduce performance of the engine.

Accordingly, an object of the present invention is to provide a new and improved particle separator system for a gas turbine engine having an enhanced capacity for collecting foreign particles carried by a stream of air entering the engine intake.

Another object of the present invention is to provide such a system which is particularly well-suited for collecting relatively fine particles carried by the air entering the engine.

Another object of the present invention is to provide such a system for reducing the amount of foreign particles entrained within the airstream entering the engine intake.

Another object of the present invention is to provide such a system which reduces the likelihood of airflow separation in preselected regions of the intake airstream and thereby reduces the pressure loss ordinarily resulting from such airflow separation.

Another object of the present invention is to provide such a system which disrupts mass transport mechanisms which contribute to particle separation inefficiencies.

Another object of the present invention is to provide such a system possessing no moving compartments, i.e. a passive system, so that the useful life of the system is relatively long.

Another object of the present invention is to provide such a system which is relatively low in cost, light in weight and effective in operation.

SUMMARY OF THE INVENTION

This invention resides in a particle separator system for a gas turbine engine wherein the separator system includes a plurality of particle extraction passageways. The gas turbine engine includes interior walls defining an engine intake passageway for receiving engine intake air and a compressor inlet passageway in communication with the engine intake passageway.

The particle separator system includes a main particle separator and an auxiliary particle separator. The main particle separator includes a main collection chamber inlet passageway which is in flow communication with the engine intake passageway and is provided by a pair of interior walls of the engine arranged so as to face one another. The auxiliary particle separator is associated with one of the interior walls of the engine and includes means defining an auxiliary passageway having an inlet opening in flow communication with the engine intake passageway. While the collection chamber inlet of the main particle separator accepts a portion of the foreign particles carried by the air entering the engine intake passageway, the auxiliary passageway of the auxiliary separator accepts an additional portion of the foreign particles. Hence, the multiple extraction passageways provided by the main collector chamber inlet and auxiliary passageways provide the engine with an enhanced capacity for separating foreign particles from the engine intake air.

BRIEF DESCRIPTION OF THE DRAWING FIGURES

DETAILED DESCRIPTION OF THE ILLUSTRATED EMBODIMENTS

Figure 1:
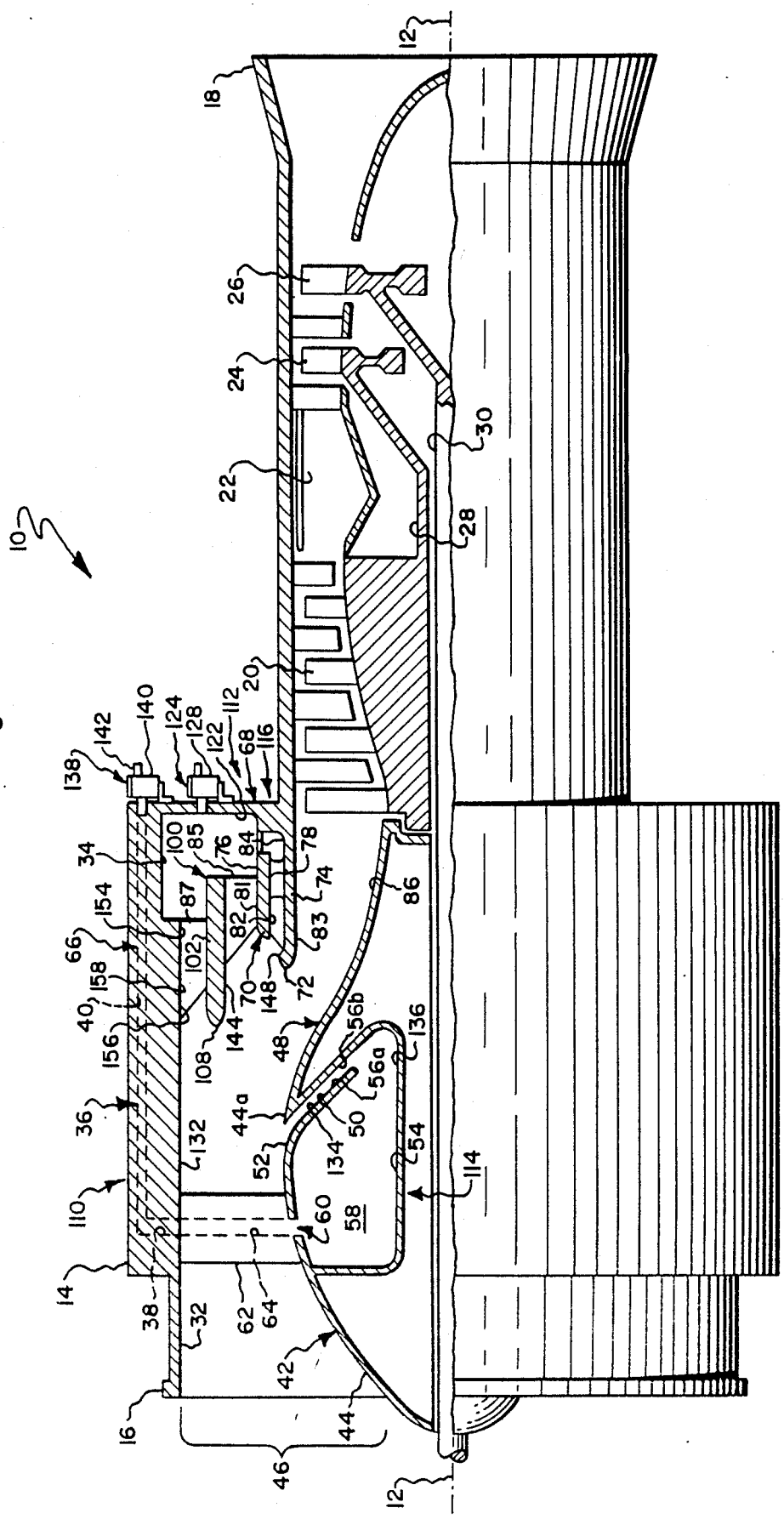
FIG. 1 is a schematic representation, shown partially in section, of a gas turbine engine in which an embodiment of a particle separator system in accordance with the present invention is incorporated.

Referring now to FIG. 1, a schematic representation of an exemplary gas turbine engine in which the present invention is incorporated is generally indicated 10. The engine 10 extends generally axially along an engine centerline axis, indicated 12, and includes a casing 14 having an open forward end 16 and an opposite open rearward end 18. Operatively mounted within the casing 14 in a manner well known in the art are hot engine components including a compressor 20, a combustor 22, a high pressure turbine 24 and a low pressure turbine 26.

The compressor 20 and high pressure turbine 24 are operatively connected by a means of a shaft 28, and the low pressure turbine 26 is operatively connected to a main engine drive shaft 30.

During operation of the turbine engine 10, air enters the forward end 16 of the casing 14 and then passes sequentially through the compressor 20 and to the combustor 22, where the air is mixed with fuel and burned. The products of combustion emerging from the combustor 22 pass sequentially through the high pressure turbine 24 and low pressure turbine 26 where the gases are expanded to extract energy therefrom. Energy extracted by the high pressure turbine 24 powers the compressor 20 through the shaft 28, and energy extracted by the low pressure turbine 26 provides the driving force for the main engine drive shaft 30. The drive shaft 30 delivers power to an energy-using device, such as a helicopter rotor system, not shown. After exiting the low pressure turbine 26, the gases of combustion pass through the rearward end 18 of the casing 14 and are thereby discharged from the engine 10.

In accordance with the present invention, the engine 10 includes means, described herein, for separating foreign particles from the stream of air entering the forward end 16 of the casing 14 so that the separated particles do not enter the compressor 20. Once separated from the air stream, the foreign particles are accumulated and/or removed from the engine 10. For accumulation and/or removal of the separated foreign particles, the engine 10 includes an appropriate network of passageways in operative flow communication with the forward end 16 of the casing. Such a passageway network can taken any of a number of forms in accordance with the broader aspects of this invention. Accordingly, although the passageways of the engine 10 utilized for accumulation and/or removal of the separated foreign particles are described herein in specific detail, it will be understood that such a description is not intended to limit the form of the passageways.

With reference still to FIG. 1, the casing 14 defines a forwardmost radially-inwardly facing annular interior wall 32 extending rearwardly from the forward end 16 to an annular cavity 34, hereinafter described. Furthermore, the casing 14 defines a passageway 36 therethrough, which passageway 36 is generally L-shaped and has one leg 38 which opens along the interior wall 32 and has another leg 40 which opens out of the casing 14 at a location arranged radially outwardly of the cavity 34. As will be apparent, the passageway 36 provides a portion of a passageway utilized for removing separated foreign particles from the engine 10.

The engine 10 further includes a hub 42 for supporting the compressor 20, combustor 22 and turbines 24, 26 within the casing 14. The hub 42 is positioned generally centrally of the casing 14 and includes a body 48 defining an arcuate outer wall 44 which extends axially in the engine 10 between the forward end 16 thereof and the compressor 20 so as to generally oppose or face the interior wall 32 of the casing 14. Collectively, the casing interior wall 32 and hub outer wall 44 define an annular intake passageway 46 for receiving engine intake air. The hub wall 44 is contoured so as to define a radially outwardmost pump 44a of maximum diameter so that a complementary narrow throat region, indicated 132, of minimum annulus area is provided in the intake passageway 46.

Figure 2:
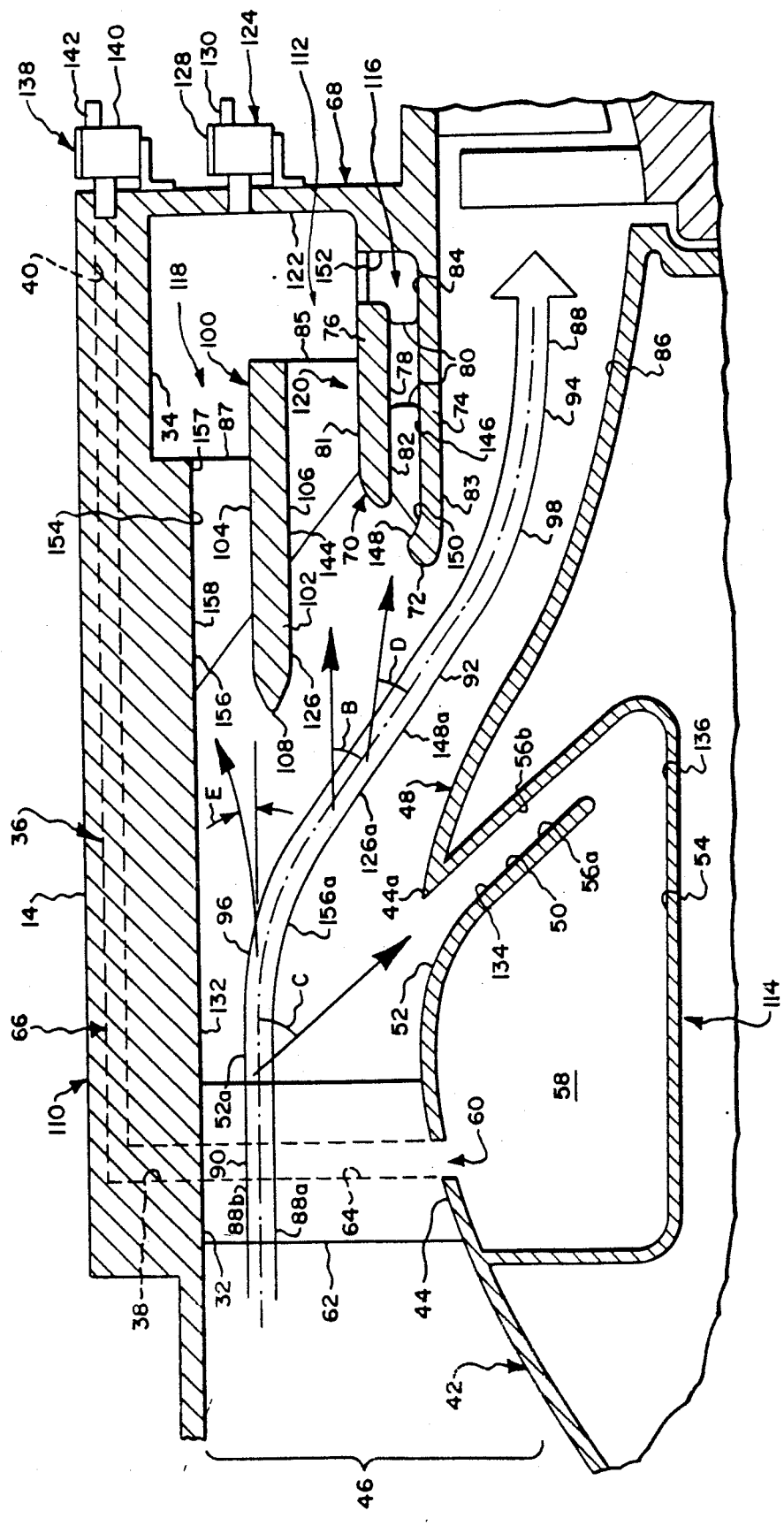
FIG. 2 is an enlarged view of a portion of the FIG. 1 engine drawn to a slightly larger scale.

With reference to FIGS. 1 and 2, the hub body 48 further defines a substantially annular passageway 50 extending from a radially outwardly-positioned entrance or opening 52 to a radially inwardly positioned annular interior cavity 54. The passageway 50 is provided by spaced wall members 56a and 56b supported within the interior of the hub body 48 and arranged so that the opening 52 generally opens or faces upstream in the intake passageway 46. The hub body 48 further includes an opening 60 in the hub surface 44, and the wall member 56b is arranged within the hub body 48 so that a passageway 58 extends between the passageway 50 and the hub opening 60.

The hub 42 is supported within the casing 14 by means of a plurality of radially-extending struts 62 (only one shown in FIGS. 1 and 2). The one illustrated strut 62 in FIGS. 1 and 2 is hollow so as to define a radially-extending passageway 64 joining the hub passageway 58 to the casing passageway 36. As will be explained hereinafter, the hub passageway 50 is adapted to accept foreign particles carried by the air entering the engine intake passageway 46, and joined passageways 58, 64 and 36 collectively provide a conduit 66 through which the particles accepted by the passageway 50 are removed from the engine 10.

With reference again to FIG. 1, the engine 10 includes means, generally indicated 68, defining a first partition joined to the casing 14. The partition means 68 is in the form of a splitter lip 70 including an upstream facing leading edge 72 and although illustrated as being supported by the casing 14, may be instead supported by the hub 42 or other alternative structure. As best shown in FIG. 2, the splitter lip 70 includes two generally concentrically-arranged sections 74 and 76 defining opposing interior walls 82 and 84, respectively, which are separated by a gap 78 for a reason hereinafter apparent and which are maintained in spaced relation by means of a plurality of circumferentially spaced struts or vanes 80. The concentrically-arranged sections 74 and 76 are contoured so as to collectively provide the splitter lip 70 with a streamlined cross-sectional appearance and include radially inwardly-facing and radially outwardly-facing walls 83 and 81, respectively, of the splitter lip 70.

As shown in FIGS. 1 and 2, the radially inwardly-facing wall 83 of the splitter lip 70 generally faces or opposes the portion of the outer wall 44 of the hub 42 situated forwardly of and adjacent the compressor 20. It follows that the splitter lip wall 83 and hub wall 44 collectively define an annular inlet passageway 86 for air entering the compressor 20. Furthermore, and as shown in FIG. 2, the engine intake passageway 46 and compressor inlet passageway 86 collectively provide a main or primary flowpath, indicated by arrow 88, for air traveling through the engine 10 toward the compressor 20. As depicted schematically by the shape of the flowpath arrow 88, the primary flowpath 88 includes a first section 90 oriented generally parallel to the engine centerline 12, a second section 92 oriented at a generally radially-inwardly directed angle in relationship to the first section 90, and a third section 94 oriented generally parallel to the engine centerline 12. It follows that the primary flowpath 88 along which air is moved from the engine intake passageway 46 includes a first bend, indicated 96, between the first and second sections 90 and 92 and a second bend, indicated 98, between the second and third sections 92 and 94. Furthermore and for a reason hereinafter apparent, the primary flowpath 88 includes opposite radially inward and outward sides 88a and 88b, respectively. For clarity in understanding, the flowpath sides 88a and 88b have been identified on the sides of the arrow 88 in FIG. 2 located in substantially the center of the engine intake passageway 46 and compressor inlet passageway 86, but it will be understood that each of the flowpath sides 88a and 88b represent corresponding portions of the hub wall 44 and casing wall 32 or splitter lip wall 83.

The engine 10 further includes means, generally indicated 100, defining a second partition supported between the interior wall 32 of the casing 14 and the radially outwardly-positioned splitter lip sector 76 by means of a plurality of circumferentially spaced vanes 85 and 87. The partition means 100 is in the form of an annular partition or airflow divider 102 defining radially outwardly-facing and radially inwardly-facing walls 104 and 106, respectively, extending rearwardly of a leading edge 108. The divider walls 104 and 106 are contoured so as to provide the divider 102 with a relatively streamlined cross-sectional appearance.

Inasmuch as the air entering the intake passageway 46 may carry with it foreign particles, such as sand or dust, due to the relatively harsh environment in which the engine 10 may be operated, the engine 10 further includes a particle separator system, generally indicated 110 which, in accordance with the present invention, provides the engine 10 with an enhanced capacity for scavenging or separating foreign particles from the stream of air entering the engine intake passageway 46. The system 110 includes structures described generally above and as further described hereinbelow. With reference again to FIG. 2, the separator system 110 includes a main or primary separator 112 for scavenging foreign particles carried by the air entering the intake passageway 46 and at least one auxiliary separator, hereinafter described. In the illustrated engine 10, there exists first, second and third auxiliary separators 114, 116 and 118, respectively, which separate from the intake air foreign particles which may otherwise not be gathered by the main separator 112 so that the air subsequently received by the compressor 20 is relatively clean.

With reference still to FIGS. 1 and 2, the main separator 112 includes means, generally indicated 120, for separating foreign particles from air traveling through the engine intake passageway 46, a scavenge air passage 122 through which the separated foreign particles are ducted, and means, generally indicated 124, for removing the separated particles from the passage 122. In the engine 10, the separating means 120 is provided by the splitter lip 70, introduced earlier. The splitter lip 70 is arranged in such a relationship with respect to the primary flowpath 88 so that foreign particles carried by the air moving through the intake passageway 46 pass to one side of the splitter lip 70 while air intended for use by the compressor 20 passes to the other side of the splitter lip 70. More specifically and with reference to FIG. 2, as intake air is directed about the first bend 96 in the primary flowpath 88, the momentum of foreign particles carried by the intake air continues moving the particles axially in the engine 10 that the particles are eventually positioned on the radially-outward side of the splitter lip 70. Consequently, particles positioned radially outwardly of the splitter lip 70 are separated by the splitter lip 70 from air entering the compressor inlet passageway 86. The separated particles are carried by a portion of the inlet flow to an external discharge located away from the compressor inlet.

The scavenge air passage 122 of the main separator 112 is provided by the annular cavity 34, introduced earlier, and is in the form of a scroll-type collection chamber which type is well known in the art. The scavenge air passage 122 is in flow communication with the engine intake passageway 46 through the spacing provided between the lip section 76 of the splitter lip 70 and divider 102, which define a passageway inlet 126 for the scavenge air passage 122 of the main separator 112. The aforesaid spacing defined between the lip section 76 and divider 102 further defines a passageway section 144 adjacent the inlet 126. A portion referred to as "primary scavenge flow", indicated 126a in FIG. 2, of the primary air flowpath 88 passes across the passageway inlet 126 during operation of the engine 10, and the passageway section 144 is oriented at an acute angle B, for example thirty degrees, in relationship in the flowpath portion 126a. Such a relationship positions the section 144 in the line of axial momentum of foreign particles to facilitate acceptance by the section 144 of intake air, and the particles therein, flowing along the primary airflowpath 88. The removing means 124 of the main separator 112 includes an inducer device 128 connected in flow communication with the scavenge air passage 122 through an opening in the casing 14 to induce scavenge flow. The device 128 may be a blower, ejector or another means of inducing flow. In operation, the inducer 128 draws the particles captured within the passage 122 and the scavenge air to the atmosphere through a pipe 130.

In accordance with one embodiment of the present invention, each auxiliary separator 114, 116 or 118 is associated with an interior wall 32, 44, or 83 of the engine 10 so as to receive foreign particles entrained within the air flowing along or near the corresponding wall 32, 44, or 83. To this end, and as will be described in greater detail hereinafter, each separator 114, 116 or 118 includes an inlet opening in flow communication with the engine intake passageway 46, a scavenge air passage through which separated particles accepted by the corresponding inlet opening of the separator 114, 116 or 118 are ducted and means for removing the separated particles from the engine 10.

With reference still to FIGS. 1 and 2, the first auxiliary particle separator 114 of the engine 10 includes the hub passageway 50, introduced earlier, having the inlet 52 which opens out of the hub outer wall 44 for receiving foreign particles moving therealong. As best shown in FIG. 2, the inlet 52 is located in the hub wall 44 so as to be positioned in the minimum annulus area of the throat region 132. As mentioned earlier, the opposing walls 56a and 56b of the hub passageway 50 are arranged so that the passageway inlet 52 faces generally forwardly in the engine 10 and is directed generally upstream in the primary flowpath 88. Furthermore and as best shown in FIG. 2, the passageway 50 includes a section, indicated 134, adjacent the inlet 52 which is oriented generally at an acute angle C, for example ten degress or less, with respect to the axially extending portion, indicated 52a, of the flow primary path 88 which moves across or past the inlet 52. Such an angular relationship of the passageway section 134 and the generally upstream orientation of the passageway inlet 52 are believed to facilitate the movement of air and foreign particles carried thereby through the inlet 52 and thereby facilitate the receipt of air and foreign particles by the passageway inlet 52.

The first auxiliary separator 114 further includes an auxiliary scavenge passage 136 connected in flow communication with the hub passageway 50 for collecting the particles received by the passageway inlet 52. In the engine 10, the auxiliary scavenge passage 136 is provided by the cavity 54 defined within the hub body 48. The separator 114 further includes means, generally indicated 138, for removing the particles and auxiliary scavenge flow captured in the separator 114. In the engine 10, the removing means 138 includes an inducer device 140 to induce the auxiliary scavenge flow and which is operatively connected in flow communication with the casing passageway 36 through the passageway leg 40. In operation, the inducer 140 draws air from the intake passageway 46 through the hub passageway 50, scavenge passage 136, strut passageway 64 and casing passageway 36 to the atmosphere through a discharge pipe 142. The amount of air extracted from the airstream moving through the engine intake passageway 46 by the first separator 112 can be controlled by, for example, appropriately regulating the power supplied to the inducer 140 or mounting baffles or the like (not shown) within the hub passageway 50. The flow inducer device 140 may be the same as or different from the device 128 used to induce primary scavenge flow.

The first auxiliary separator 114 is advantageous in that it promotes the collection of foreign particles entrained within an amount of intake air flowing adjacent the hub wall 44 including, but not limited to, the boundary layer. Inasmuch as foreign particles carried by the intake air may possess the consistency of coarse sands and/or very fine dust, such particles may remain entrained by the portion of intake air flowing adjacent the hub wall 44 and are apt to be ingested into the compressor 20, combustor 22, turbines 24 and 26 and any other internal device or passage. Such particles, if permitted to enter the engine through the passage 18 may cause abrasion of components or deposit on internal surfaces or plug internal cavities causing deterioration of engine components and performance.

In operation, the first auxiliary separator 114 draws air flowing along the hub wall 44 through the passageway inlet 52. The constant extraction of air through the inlet 52 is believed to facilitate the capture of slow moving and/or fine particles otherwise not collectable if no air were extracted through the hub wall 44. These particles have insufficient momentum to carry them into the main separator 112 and are likely to enter the compressor 30 through the compressor inlet 86. Instead, the entrained particles are drawn into the passageway inlet 52 and are thereby separated from the intake air moving toward the compressor 20. Hence, the first separator 114 is believed to be especially well-suited for separating relatively fine particles from the intake air, which particles are entrained within the amount of air moving along the hub wall 44, and for larger particles having low velocity, both of which have inadequate momentum to be collected at other locations.

With reference still to FIGS. 1 and 2, the second auxiliary particle separator 116 of the engine 10 includes a passageway 146 provided by the annular gap 78 defined between the concentrically-arranged sections 74 and 76 of the splitter lip 70. As best shown in FIG. 2, the splitter lip passageway 146 defines an inlet 148 opening out of the radially outwardly-facing wall 81 of the splitter lip 70 proximate to the leading edge 72 and includes a section, indicated 150, adjacent the inlet 148 oriented at generally an acute angle D, for example twenty-five degrees, in relation to the portion, indicated 148a, of the primary flowpath 88 (FIG. 2) flowing across the inlet 148 to facilitate the acceptance of air and foreign particles carried thereby by the passageway 146.

The splitter lip passageway 146 further defines an outlet 152 between downstream ends of the splitter lip walls 82 and 84 in flow communication with the scavenge air passage 122. The auxiliary scavenge passage of the second auxiliary separator may be 116 provided by the primary scavenge passage 122, introduced earlier, so that particles entering the passageway 146 through the inlet 148 are ducted through the passage 122. Furthermore, the means for removing particles gathered by the passageway 146 within the chamber 122 includes the flow inducer or induction device 128. In operation, the inducer 128 draws engine intake air through the passageway 146 and collection chamber 122 to the atmosphere through the discharge pipe 130. The amount of air extracted by the auxiliary separator 116 from the airstream moving through the engine 10 can be controlled by, for example, appropriate regulation of the blower 128 or the placement of baffles or the like (not shown) within the splitter lip passageway 146. Alternatively, a scavenge passage and/or flow induction system may be used which is independent of the primary scavenge system 112.

The second auxiliary separator 116 is advantageous in that its passageway 146 accepts foreign particles including the particles which are not retained by the main separator 112 due to bounce or other effects. It is believed that such additional particles are concentrated about the splitter lip 70 and, as a result, are likely to be drawn into the separator passageway 146.

An additional advantage provided by the second auxiliary separator 116 relates to the local flow field effects around the splitter lip 70 and can be readily appreciated when considering such flow field effects about a conventional, smoothly-surfaced splitter lip having no passageway therein comparable to the splitter lip passageway 146. Typically, the amount of air drawn into the inlet of a separator system is much less (i.e., less than twenty percent) than the amount of air moving through the compressor inlet passageway. Consequently, the air moving along the compressor inlet side of a conventional splitter lip is moving much faster than is the air moving along the separator system side of the splitter lip. Due, at least in part, to the differences in the velocity of air moving on opposite sides of the splitter lip and the consequent acceleration of air moving around the leading edge of the lip, the flow of air about the splitter lip has a tendency to separate from the wall (i.e., flow does not remain attached) in the vicinity of its leading edge. Such a flow separation is known to contribute appreciably to an undesirable pressure loss in the stream of air flowing past the splitter lip toward the compressor.

The second auxiliary separator 116, on the other hand, enhances the flow patterns of air around the splitter lip 70 in a manner which reduces the likelihood of flow separation in the vicinity of the leading edge 72 of the splitter lip 70. Such a enhancement is believed to be due to the induced extraction of air through the passageway inlet 148 by the separator 116 and along the splitter lip wall 84, and such an induced extraction of air is believed to reduce the acceleration of air around the leading edge 72. As a result, the flow of air in the vicinity of the splitter lip 70 is less likely to separate, and the pressure loss in the primary airflow stream flowing past the splitter lip 70 toward the compressor 20 is effectively reduced.

The reduction in pressure loss of air flowing around the splitter lip 70 as a consequence of the passageway 146 provides an advantage relating to engine design. More specifically, because the splitter lip 70, with the separator passageway 146 defined therein, is believed to provide less of a pressure loss in the primary air stream than that provided by a conventional splitter lip, the splitter lip 70 may be mounted within the casing 14 so as to be positioned forwardly of the location at which a conventional splitter lip would be normally mounted. Such a permitted forward mounting would consequently increase the particle collection efficiency by the primary separator 112 without reducing the pressure loss of the air stream around the splitter lip 70 beyond a predetermined or unacceptable level.

With reference still to FIGS. 1 and 2, the third auxiliary particle separator 118 of the engine 10 includes a passageway, indicated 154, defined between the casing interior wall 32 and the radially outwardly-facing wall 104 of the divider 102. The passageway 154 defines an upstream facing inlet 156 for receiving foreign particles and includes a downstream facing outlet 157 which may be in flow communication with the air scavenge passage 122. It follows that the air scavenge passage associated with the third auxiliary separator 118 may be the same air scavenge passage 122 that is associated with the second auxiliary separator 116, and the corresponding means of removing collected particles from the chamber 122 includes the device 128. In operation, the flow induction device 128 draws an amount of air from the engine intake air through the passageway 154 and collection chamber 122 to the atmosphere. Control of the amount of air extracted from the intake air through the passageway 154 can be had, for example, by appropriate regulation of the blower 128 or placement of baffles (not shown) within the passageway 154.

As best shown in FIG. 2, the passageway 154 has a section, indicated 158, located adjacent the inlet 156, which section 158 is oriented at generally an acute angle E, for example ten degress or less, in relationship to the axially extending portion, indicated 52a (or 90), of the primary air flowpath 88 moving across the inlet 156. Such an orientation is believed to facilitate the acceptance of air directed toward the inlet 156 and, as a result, is believed to facilitate the acceptance of foreign particles carried by the air entering the inlet 156. Because one wall of the passageway 156 is provided by a portion of the casing interior wall 32, the third auxiliary separator 118 is believed to be particularly well-suited for extracting air from the intake air which moves adjacent and along the casing wall 32. Hence, the third auxiliary separator 118 promotes a relatively rapid flow of air along the casing wall 32 so that foreign particles carried by the air adjacent the casing wall 32 are collected by the separator 118.

The third particle separator 118 is further advantageous with regard to flow separation characteristics in the engine 10 and along the casing wall 32. It is known that due to the high velocity of air moving along the primary flowpath 88 (FIG. 2), the airflow is likely to separate along the casing wall 32 downstream of the throat region 132 of the intake passageway 46. Such a separation is due, at least in part, to the inability of air to expand or diffuse rapidly enough to accommodate the increase in flow cross-sectional area downstream of the throat 132. As a consequence of such a flow separation, regions of unstable separated flow are created, and foreign particles caught up in these separated flow regions may be thrown to a location in the primary airflow stream, such as for example to a location located centrally of the flow stream, at which the particles may not be scavenged before entering the compressor 20.

The third particle separator 118, with its passageway 154, is believed to reduce the likelihood of flow separation along the casing wall 32. Such a reduction in flow separation is believed to be due, at least in part, to the inclusion of the divider 102 between the splitter lip 70 and casing wall 32 which accommodates the drawing off of a desired or predetermined amount of air flowing along the casing wall 32. Hence, the divider 102 permits the favoring of one cross-sectional zone of flow over another, and by regulating the amount of air extracted or pulled from the favored zone, the likelihood of flow separation along the casing wall 32 is substantially reduced. Furthermore, the divider 102 and vanes 87 permit the addition of blockage for reducing the flow area in a manner which does not create surfaces angled so as to create adverse bounce directions of impacting particles. This reduction in flow area contributes to the reduced tendency for flow separation. Furthermore and because the passageway 154 reduces the likelihood of flow separation along the casing wall 32, the pressure loss in the airflow moving around the first bend 96 (FIG. 2) in the primary flowpath 88 is reduced.

The third particle separator 118 provides another advantage in that it disrupts mass transport mechanisms which can contribute to sand separation inefficiencies. Such mass transport mechanisms are a consequence of the highly turbulent flow of air moving through the intake passageway 46 which may, in various regions of the flow, direct air in a swirling fashion back upon itself in an unsteady, time variant manner. If, therefore, particles entrained within such regions are carried into the entrance of a primary particle separator of a conventional engine, the swirling action of the air may subsequently carry the particles back out of the separator entrance so that the particles are not collected by the separator before entering the compressor.

In comparison, the passageway 154 of the third auxiliary separator 118 provides the air entering the passageway inlet 156 with a clearly defined and relatively narrow passageway to follow as the air moves toward the scavenge air passage 122. The defined passageway 154, with its walls 32 and 104, thus stabilizes the flow and prevents to a large extent the swirling of air entering the passageway inlet 156 in a manner which might otherwise carry particles back out of the inlet 156 and into the primary flow-path 88.

It follows from the foregoing that each of the inlets 52, 148, 156 of the auxiliary particle separators 114, 116, 118 as well as the inlet 126 of the main separator 112 are located to one side of the inward side 88a or the outward side 88b of the primary air flowpath 88. Because of such a disposition of the passageway inlets 52, 126, 148 and 156 away from the center of the main flowpath 88, none of the passageway inlets 52, 126, 148 or 156 are believed to appreciably increase the pressure loss of the airstream flowing through the engine 10. Furthermore, and to the extent that the passageway inlet 52, 126, 148 or 156 reduces the likelihood of flow separation in the airflow stream, the passageway inlet 52, 126, 148 or 156 may reduce the engine pressure loss.

Still further, and as mentioned earlier in connection with the second auxiliary separator 116, to the extent that the separator passageway inlets 52, 126, 148 and 156 each disrupt patterns in the air flow adjacent the corresponding inlet 52, 126, 148 or 156, several engine design modifications can be exploited to provide a predetermined or reduced pressure loss in the airstream moving toward the compressor 20 or further improve the collection efficiency of the separator system 110. Such design modifications include the altering of the size of the separator passageway inlets 52, 126, 148, 156, a change in the splitter lip location relative to the main flowpath 88, the alteration in the contour of the interior walls 32, 44, 82, 84 of the engine 10, an adjustment in the focus of the scroll vanes 80, or appropriate changes to achieve a uniform scavenge extraction through the separator passageway inlets 52, 126, 148, 156.

Figure 3:
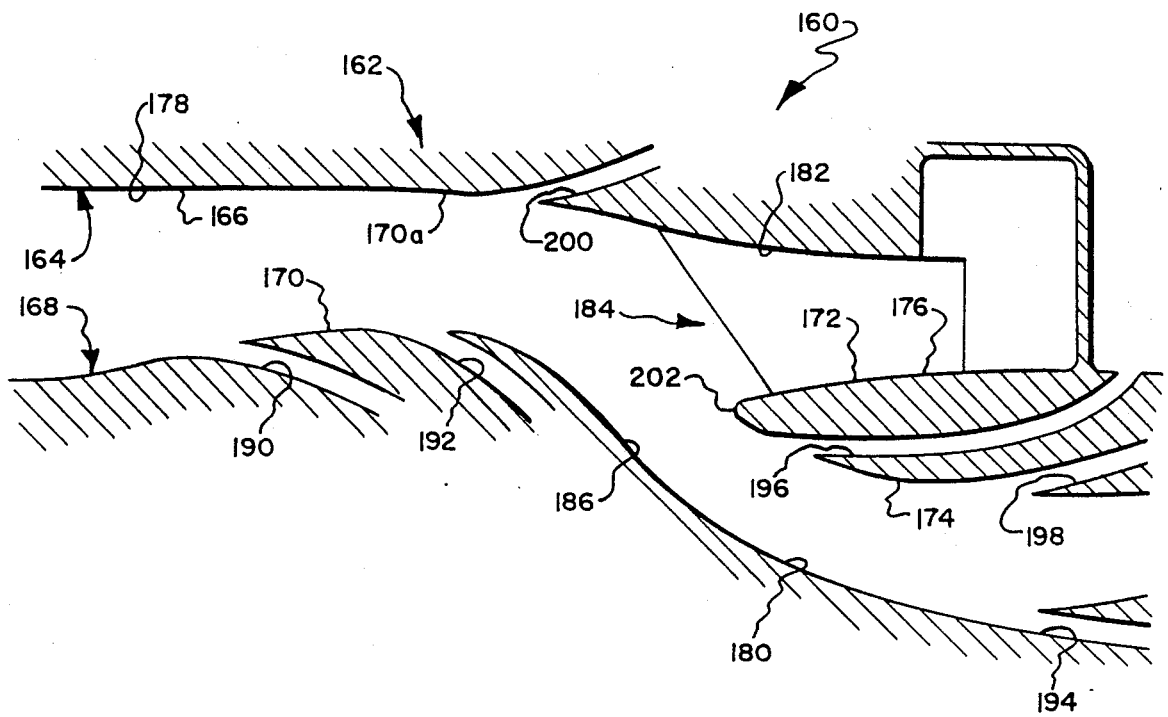
FIG. 3 is schematic representation of a portion of a gas turbine engine in which an alternative embodiment of a particle separator system in accordance with the present invention is incorporated.

With reference to FIG. 3, there is schematically illustrated a gas turbine 160 in which an alternative separator system in accordance with the present invention is embodied. The engine includes a casing 164 having an interior wall 166, a hub 168 having an outer wall 170 and a splitter lip 172 having a radially inwardly-facing wall 174 and a radially outwardly-facing wall 176. Collectively, the casing wall 166 and hub wall 168 provide an intake passageway 178 for the engine 160 which passageway defines a throat 170a. Similarly, the splitter lip wall 174 and hub wall 168 collectively provide an inlet passageway 180 of the engine compressor (not shown), and the splitter lip wall 176 and casing wall 166 collectively provide an inlet passageway for a scavenge air passage for a main particle separator 184.

In accordance with the present invention, the engine 160 includes a separator system 162 having, in addition to the aformentioned main particle separator 184, at least one auxiliary particle separator. In the engine 160, there exists six auxiliary separators including passageways 190, 192, 194, 196, 198 and 200 as shown in FIG. 3. Three auxiliary passageways 190, 192 and 194 open out of the hub wall 170 wherein two passageways 190, 192 open at locations defined upstream of the throat 170a in a converging portion of passage 178 and one passageway 194 opens at a location defined downstream of the throat 170a in a diverging portion of passage 178 and within the compressor inlet passageway 180. Two auxiliary passageways 196 and 198 open out of the splitter lip wall 174 wherein one passageway 196 opens at a location immediately downstream and proximate to the leading edge, indicated 202, of the splitter lip 172 and the other passageway 198 opens remote of the leading edge 202. The remaining passageway 200 opens out of the casing wall 166 at a location at about the throat 170a. In operation, the aforedescribed and illustrated passageways 190, 192, 194, 196, 198 and 200 receive an amount of intake air flowing adjacent the corresponding wall and thereby receive foreign particles carried by the received amount of air. Associated means for removing the particles collected by the separator system 196 can be any of a number of removal means, including blowers or ejectors, known in the art and which are appropriately joined in fluid communication to the separator passageways 190, 192, 194, 196, 198 and 200. It follows from the foregoing that the passageways of auxiliary separators in accordance with the broader aspects of this invention can open at any of a number of locations along the interior walls of an engine.

Figure 4:
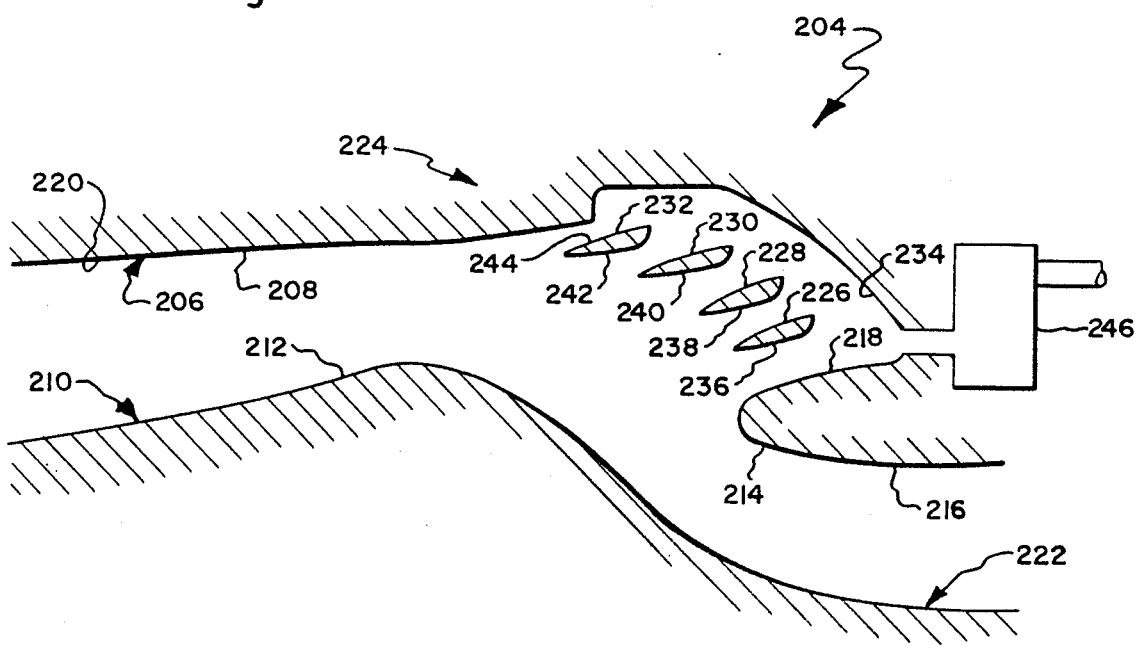
FIG. 4 is a view similar to that of FIG. 3 of a gas turbine engine in which another embodiment of a particle separator system in accordance with the present invention is incorporated.

With reference to FIG. 4, there is schematically illustrated an engine 204 in which another alternative separator system in accordance with the present invention is embodied. The engine 204 includes a casing 206 having a radially inwardly-directed interior wall 208, a hub 210 having a radially outwardly-directed outer wall 212 and a splitter lip 214 having a radially inwardly-facing wall 216 and a radially outwardly-facing wall 218. Collectively, the casing wall 208 and hub wall 212 define an intake passageway 220 for the engine 204. Similarly, the splitter lip wall 216 and hub wall 212 collectively define an inlet passageway 222 for the engine compressor (not shown). Furthermore, a plurality of annular partitions or dividers 226, 228, 230, and 232 are operatively mounted in spaced relation between the casing wall 208 and splitter lip wall 218, as shown in FIG. 4.

In accordance with the present invention, the engine 204 includes a separator system 224 including a plurality of passageways 236, 238, 240, 242 and 244, as shown in FIG. 4, for receiving foreign particles carried by the intake air moving toward the compressor inlet passageway 222. Passageway 236 is provided by the annular slot defined between the splitter lip wall 218 and divider 226; passageway 238 is provided by the annular slot defined between divider 226 and divider 228, passageway 240 is provided by the annular slot defined between divider 228 and divider 230; passageway 242 is defined between divider 230 and divider 232; and passageway 244 is defined by the annular slot defined between the divider 232 and casing wall 208. As shown in FIG. 4, each passageway 236, 238, 240, 242 or 244 is in flow communication with an air scavenge passage 234 defined within the casing 206.

When the engine 204 is in operation, the passageways 236, 238, 240, 242 and 244 accept intake air moving through the intake passageway 220 and along the casing wall 208 and thereby accept foreign particles entrained within the accepted intake air. Particles collected by the collection chamber 234 through the passageways 236, 238, 240, 242 and 244 can be removed therefrom by suitable means, such as a blower or ejector 246. As does the divider 102 of the engine 10 of FIGS. 1 and 2, the dividers 226, 228, 230 and 232 of FIG. 4 reduce the likelihood of flow separation along the casing wall 208 and disrupt mass transport mechanisms which may contribute to particle separation inefficiencies. On the other hand, the dividers 226, 228, 230, and 232 of the FIG. 4 engine 204 provide an alternative means to the engine divider 102 illustrated in FIGS. 1 and 2 for effectively favoring selected regions of the intake air flow. It may be desirable, in either event, that the airflow through the separator passageways defined by the casing wall, dividers and splitter lip be balanced in order to obtain acceptable characteristics or patterns of the airstream moving through the engine.

While there have been described herein various alternative embodiments of the particle separator system of the invention, other modifications will occur to those skilled in the art from the teachings herein, and it is, therefore, desired to secure in the apended claims all such modifications as fall within the true spirit and scope of the invention. For example, although the separator system embodiments of FIGS. 1-4 have been shown and described as incorporated in engines having annular, or axi-symetric, intake passageways, separator systems in accordance with this invention can be utilized in engines having non axi-symetric intake passageways. Furthermore, this invention may be utilized in engines having either axial flow or swirl-type separators and may be integrated within movable engine components or within the stationary engine components or airframe/installation.

Still further, although the particle separator system embodiments of the engines of FIGS. 1-4 have been shown and described as including at least four annular separator passageways through which foreign particles are collected, a separator system in accordance with the present invention may include as few as two such passageways. Yet still further, one passageway of the separator system may or may not be associated with or integrated into the collection and removal means of another system passageway. Fo example, two passageways of a separator system may utilize separate blowers or a single, common blower for removal of collected particles. Furthermore, two passageways of a separator system may utilize a single, common network of scavenge air passages or a separate network of scavenge air passages. Accordingly, the aforedescribed embodiments are intended for purposes of illustration and not as limitation.

Having thus described illustrative embodiments of the invention, what is claimed as novel and desired to be secured by Letters Patent of the United States is:

1. A particle separator system for a gas turbine engine including interior walls defining an engine intake passageway including a throat for receiving engine intake air and an annular compressor inlet passageway in flow communication with the engine intake passageway, said system comprising:
   a main particle separator including an inlet passageway disposed downstream of said throat and in flow communication with the engine intake passageway for receiving a portion of foreign particles carried by the air entering the engine intake passageway, said inlet passageway of said main particle separator being provided by a pair of interior walls of the engine arranged so as to face one another, and
   an auxiliary particle separator associated with one interior wall of the engine including means defining an auxiliary passageway having an inlet downstream of said throat and in flow communication with said engine intake passageway for receiving an additional portion of foreign particles carried by the air entering the engine intake passageway so that the main and auxiliary particle separators provide the engine with an enhanced capacity for separating foreign particles from the engine intake air.

2. The system as defined in claim 1 wherein the engine intake passageway and the compressor inlet passageway collectively define a primary flowpath for intake air moving generally axially through the engine, said primary flowpath including a portion moving across the auxiliary passageway and said auxiliary passageway includes a section arranged generally in an angular relationship with respect to the portion of the primary flowpath moving across the auxiliary passageway inlet to facilitate the acceptance of intake air flowing through the engine by the auxiliary passageway inlet.

3. The system as defined in claim 1 wherein said auxiliary passageway inlet is oriented relative to said one interior wall so as to generally face upstream in the primary flowpath.

4. The system as defined in claim 1 wherein said auxiliary passageway inlet is generally annular.

5. The system as defined in claim 1 wherein the auxiliary passageway is associated with said one interior engine wall so as to accept an amount of intake air flowing along and adjacent said one interior engine wall.

6. The system as defined in claim 1 wherein the engine intake passageway and the compressor inlet passageway collectively define a main flowpath for intake air moving generally axially through the engine, said main flowpath being arranged within said engine so as to define an outward side and an inward side, and said inlet of said auxiliary passageway is arranged to one side of said outward side and said inward side of said main flowpath.

7. The system as defined in claim 1 wherein said engine includes a hub having an outer wall and said one wall is provided by said hub outer wall.

8. The system as defined in claim 1 wherein the inlet of said auxiliary passageway is located along said one wall in proximity to said throat.

9. The system as defined in claim 1 wherein said one wall is provided by an interior wall of the engine providing said inlet passageway of said main particle separator and said inlet of said auxiliary passageway opens out of said one wall.

10. The system as defined in claim 9 wherein the engine includes a splitter lip having a radially outwardly-facing wall and a leading edge directed generally forwardly in the engine, said one wall is provided by said radially outwardly-facing wall of said splitter lip, and said inlet of said auxiliary passageway is located proximate to said leading edge.

11. An inlet particle separator system for a gas turbine engine comprising:
   a main particle separator including:
      a casing having a first wall;
      a hub having a second wall spaced from said first wall to define an intake passageway for receiving engine intake air, said second wall having a portion of maximum diameter defining a throat in said intake passageway;
      a splitter lip spaced downstream from said throat and spaced from said second wall to define an inlet passageway for a compressor of the gas turbine engine in flow communication with said intake passageway and spaced from said first wall to define a first foreign particle passageway in flow communication with said intake passageway for receiving foreign particles therefrom; and
   an auxiliary particle separator comprising: an inlet disposed in at least one of said first wall, second wall and splitter lip downstream of said throat for receiving foreign particles entrained within air flowable along said first wall, second wall and splitter lip, respectively.

12. An inlet particle separator system according to claim 11 further including two of said auxiliary particle separators each disposed in a respective one of said first wall, second wall and splitter lip.

13. An inlet particle separator system according to claim 11 further including three of said auxiliary particle separators each disposed in a respective one of said first wall, second wall and splitter lip.

14. An inlet particle separator system according to claim 11 wherein said auxiliary particle separator further comprises said inlet disposed in said maximum diameter portion of said second wall;
   a hub passageway extending radially inwardly from said inlet; and
   means for channeling foreign particles away from said hub passageway.

15. An inlet particle separator system according to claim 14 wherein said channeling means comprise:
- a scavenge passageway in flow communication with said hub passageway for collecting foreign particles;
- a plurality of struts extending between said casing and said hub and including a strut passageway therein in flow communication with said scavenge passageway;
- a casing passageway disposed within said casing and in flow communication with said strut passageway; and
- means for removing foreign particles from said casing passageway.

16. An inlet particle separator system according to claim 14 wherein said hub passageway has a section adjacent to said inlet disposed at an acute angle to a portion of said intake passageway disposed adjacent to said inlet.

17. An inlet particle separator system according to claim 16 wherein said acute angle is up to 10 degrees.

18. An inlet particle separator system according to claim 11 wherein said auxiliary particle separator further comprises said splitter lip having first and second radially spaced apart sections, said second section having a leading edge spaced upstream from said first section and said first and second sections defining theebetween said inlet proximate to said leading edge and a splitter lip passageway; and
- means for channeling foreign particles away from said splitter lip passageway.

19. An inlet particle separator system according to claim 18 wherein said channeling means channel said foreign particles from said auxiliary particle separator into said main particle separator, and further including means for removing foreign particles from said main particle separator.

20. An inlet particle separator system according to claim 18 wherein said splitter lip passageway includes a section adjacent to said inlet oriented at an acute angle to a portion of said intake passageway disposed adjacent to said inlet.

21. An inlet particle separator system according to claim 20 wherein said acute angle is about 25 degrees.

22. An inlet particle separator system according to claim 11 wherein said auxiliary particle separator further comprises:
- a divider spaced between said casing and said splitter lip and defining a divider passageway between said casing and said divider having said inlet facing in an upstream direction; and
- means for channeling foreign particles away from said divider passageway.

23. An inlet particle separator system according to claim 22 wherein said channeling means channel said foreign particles from said auxiliary particle separator into said main particle separator, and further including means for removing foreign particles from said main particle separator.

24. An inlet particle separator system according to claim 22 wherein said divider passageway includes a section adjacent to said inlet inclined radially outwardly at an acute angle to a portion of said intake passageway disposed adjacent to said inlet.

25. An inlet particle separator system according to claim 24 wherein said acute angle is up to 10 degrees.

26. An inlet particle separator system according to claim 11 wherein said auxiliary particle separator comprises:
- a first auxiliary particle separator including a first inlet disposed in said maximum diameter portion of said second wall; a hub passageway extending radially inwardly from said first inlet; and first means for channeling foreign particles away from said hub passageway; and
- a second auxiliary particle separator including said splitter lip having first and second radially spaced apart sections, said second section having a leading edge spaced upstream from said first section and said first and second sections defining therebetween a second inlet proximate to said leading edge and a splitter lip passageway; and second means for channeling foreign particles away from said splitter lip passageway.

27. An inlet particle separator system according to claim 26 wherein:
said first channeling means comprise:
- a scavenge passageway in flow communication with said hub passageway for collecting foreign particles;
- a plurality of struts extending between said casing and said hub and including a strut passageway therein in flow communication with said scavenge passageway;
- a casing passageway within said casing and in flow communication with said strut passageway;
- first means for removing foreign particles from said casing passageway; and
- said hub passageway has a section adjacent to said first inlet disposed at an acute angle to a portion of said intake passageway disposed adjacent to said first inlet; and
said second channeling means channels foreign particles away from said second auxiliary particle separator into said main particle separator, and further includes second means for removing foreign particles from said main particle separator; and said splitter lip passageway includes a section adjacent to said second inlet oriented at an acute angle to a portion of said intake passageway disposed adjacent to said second inlet.

28. An inlet particle separator system according to claim 11 wherein said auxiliary particle separator comprises:
- a second auxiliary particle separator comprising:
  - said splitter lip having first and second radially spaced apart sections, said second section having a leading edge spaced upstream from said first section and said first and second sections defining therebetween a second inlet proximate to said leading edge and a splitter lip passageway; and
  - second means for channeling foreign particles away from said splitter lip passageway; and
- a third auxiliary particle separator comprising:
  - a divider spaced between said casing and said splitter lip and defining a divider passageway between said casing and said divider having a third inlet facing in an upstream direction; and
  - third means for channeling foreign particles away from said divider passageway.

29. An inlet particle separator system according to claim 28 wherein:

said second channeling means channel said foreign particles away from said second auxiliary particle separator into said main particle separator;
said splitter lip passageway includes a section adjacent to said second inlet oriented at an acute angle to a portion of said intake passageway disposed adjacent to said second inlet;
said third channeling means channel said foreign particles from said third auxiliary particle separator into said main particle separator;
said divider passageway includes a section adjacent to said third inlet inclined radially outwardly at an acute angle to a portion of said intake passageway disposed adjacent to said third inlet; and
further including means for removing foreign particles from said main particle separator.

30. An inlet particle separator system according to claim 11 wherein said auxiliary particle separator comprises:
   a first auxiliary particle separator including:
      a first inlet disposed in said maximum diameter portion of said second wall;
      a hub passageway extending radially inwardly from said first inlet; and
      first means for channeling foreign particles away from said hub passageway;
   a second auxiliary particle separator including:
      said splitter lip having first and second radially spaced apart sections, said second section having a leading edge spaced upstream from said first section and said first and second sections defining therebetween a second inlet proximate to said leading edge and a splitter lip passageway; and
      second means for channeling foreign particles away from said splitter lip passageway; and
   a third auxiliary particle separator including:
      a divider spaced between said casing and said splitter lip and defining a divider passageway between said casing and said divider having a third inlet facing in an upstream direction; and
      third means for channeling foreign particles away from said divider passageway.

31. An inlet particle separator system according to claim 30 wherein:
   said first channeling means comprise:
      a scavenge passageway in flow communication with said hub passageway for collecting foreign particles;
      a plurality of struts extending between said casing and said hub and including a strut passageway therein in flow communication with said scavenge passageway;
      a casing passageway within said casing and in flow communication with said strut passageway;
      first means for removing foreign particles from said casing passageway; and
      said hub passageway has a section adjacent to said first inlet disposed at a first acute angle to a portion of said intake passageway disposed adjacent to said first inlet;
   said second channeling means channels said foreign particles from said second auxiliary particle separator into said main particle separator, and said splitter lip passageway includes a section adjacent to said second inlet oriented at a second acute angle to a portion of said intake passageway disposed adjacent to said second inlet; and
   said third channeling means channels said foreign particles from said third auxiliary particle separator into said main particle separator, and said divider passageway includes a section adjacent to said third inlet inclined radially outwardly at a third acute angle to a portion of said intake passageway disposed adjacent to said third inlet; and
   further including means for removing foreign particles from said main particle separator.

32. An inlet particle separator system according to claim 31 wherein said first acute angle is up to 10 degrees, said second acute angle is about 25 degrees, and said third acute angle is up to 10 degrees.

33. An inlet particle separator system according to claim 32 further including a plurality of circumferentially spaced vanes extending between said casing and said divider and said splitter lip.

* * * * *